United States Patent [19]
Kato

[11] Patent Number: 6,066,882
[45] Date of Patent: May 23, 2000

[54] SEMICONDUCTOR PRESSURE DETECTING DEVICE

[75] Inventor: Hajime Kato, Tokyo, Japan

[73] Assignee: Mitsubishi Denki Kabushiki Kaisha, Tokyo, Japan

[21] Appl. No.: 09/085,835

[22] Filed: May 28, 1998

[30] Foreign Application Priority Data

Jan. 12, 1998 [JP] Japan ................................. 10-003812

[51] Int. Cl.⁷ .......................... H01L 27/14; H01L 29/82; H01L 29/84
[52] U.S. Cl. .......................... 257/414; 257/415; 257/417; 73/723; 73/724; 73/725; 73/726; 73/727; 73/DIG. 4; 438/50; 438/51
[58] Field of Search .................... 257/414, 415, 257/417, 418, 420; 73/31.06, DIG. 4, 756, 754, 717, 722, 723, 724, 725, 726, 727; 438/50, 51

[56] References Cited

U.S. PATENT DOCUMENTS

| | | | |
|---|---|---|---|
| 4,843,454 | 6/1989 | Kato et al. .................................. | 357/79 |
| 5,050,838 | 9/1991 | Beatty et al. ............................. | 251/11 |
| 5,408,885 | 4/1995 | Araki ....................................... | 73/708 |
| 5,461,922 | 10/1995 | Koen ....................................... | 73/756 |
| 5,629,538 | 5/1997 | Lipphardt et al. ....................... | 257/254 |
| 5,756,899 | 5/1998 | Ugai et al. ................................ | 73/714 |
| 5,852,320 | 12/1998 | Ichihasi .................................... | 257/419 |

FOREIGN PATENT DOCUMENTS 63-196826   8/1988   Japan .

*Primary Examiner*—William Mintel
*Attorney, Agent, or Firm*—Oblon, Spivak, McClelland, Maier & Neustadt, P.C.

[57] ABSTRACT

A semiconductor pressure detecting device which effectively reduces stress that occurs on a base member due to welding between cap and the base member or any external load. The semiconductor pressure detecting device includes a semiconductor sensor element capable of detecting a strain and/or stress that occurs on a thin-walled pressure receiving portion; a pedestal seat for joining and supporting the semiconductor sensor element; a base member for joining and supporting the pedestal seat; and a cap member welded and joined to the base member so as to cover the base member, the pedestal seat and the semiconductor sensor element. A fluid pressure that acts on a pressure chamber is detected by the semiconductor sensor element, the base member has a body portion of a specified thickness and a thin-walled flange portion formed integrally with an outer circumferential portion of the body portion, a flange portion is provided at an opening end of the cap member and is welded and joined to the flange portion of the base member, a thickness of the flange portion of the base member being set substantially equal to or less than a thickness of the flange portion of the cap member.

5 Claims, 6 Drawing Sheets

SEMICONDUCTOR PRESSURE DETECTING DEVICE

BACKGROUND OF THE INVENTION

1. Field of the Invention

The present invention relates to semiconductor pressure detecting devices and, more particularly, to a semiconductor pressure detecting device which uses, as its detector element, a semiconductor sensor element capable of detecting a strain and/or stress that occurs to a thin-walled pressure receiving portion.

2. Discussion of the Background

Conventionally, as one type of pressure detecting device, there has been known one which uses, as its detector element, a semiconductor sensor element (hereinafter, abbreviated simply as sensor element when appropriate) capable of detecting a strain and/or stress that occurs to a thin-walled diaphragm-like pressure receiving portion by making use of the semiconductors' piezoresistance effect (see, for example, Japanese Patent Laid-Open Publication SHO 63-196826).

Using this type of sensor element makes it possible to detect with high accuracy the magnitude and/or change of a pressure that acts on the pressure receiving portion as a magnitude and/or change of a strain and/or stress and then to convert the detection result into an electric signal as an output.

Such a semiconductor pressure detecting device requires not only the semiconductor sensor element having a gauge resistor but also various peripheral circuits such as a resistor circuit for adjusting electrical characteristics of the sensor element. These peripheral circuits and the like, in recent years, tend to be incorporated and integrated into the sensor element itself.

In this case, the size (in particular, planar size) of a semiconductor sensor element would become larger than when the peripheral circuits and the like are formed on a separate board. This in turn would cause component members (later-described pedestal seat and base member) that support the sensor element to be inevitably increased in size as well.

FIG. 9 is a longitudinal cross-sectional explanatory view showing the basic construction of a semiconductor pressure detecting device (hereinafter, abbreviated simply as pressure detecting device or device when appropriate) according to the prior art.

As shown in FIG. 9, this pressure detecting device 101 according to the prior art comprises a semiconductor sensor element 102 made of silicon (Si) single crystal and having at a central portion a thin-walled diaphragm-like pressure receiving portion 102a, a pedestal seat 103 made of silicon for joining and supporting the sensor element 102, and a metallic base member 104 for joining and supporting the pedestal seat 103. A pressure introducing pipe 105 is joined to the base member 104.

In the semiconductor sensor element 102, not only a gauge resistor but also peripheral circuits such as a resistor circuit for adjusting the electrical characteristics of the sensor element 102 are incorporated and integrated. Accordingly, the sensor element 102 as well as the pedestal seat 103 and the base member 104 for supporting the sensor element 102 are increased in size (particularly, planar size) as compared with the case in which peripheral circuits and the like are formed on a separate board.

The base member 104 has a body portion 104a for joining and supporting the pedestal seat 103 on its top side, and a thin-walled flange portion 104b provided on its outer peripheral side. This flange portion 104b is formed integrally with the body portion 104a by compression molding an outer peripheral portion of the body portion 104a with a press. To this flange portion 104b of the base member 104, is joined a flange portion 111c provided at an opening end of a metallic cap 111.

To the body portion 104a of the base member 104, are fixed a plurality of lead wires 113 that are inserted and led thicknesswise through the base member 104. The lead wires 113 are electrically connected to the sensor element 102 via wires 112 made of, for example, gold (Au).

Also, the pedestal seat 103 has a pair of fitting plates 103a, 103b which are opposed to each other with an annular recess 103g therebetween. The sensor element 102 is joined to the upper surface of the upper fitting plate 103b, while the lower surface of the lower fitting plate 103a is joined to the upper surface of the body portion 104a of the base member 104.

The sensor element 102 and the pedestal seat 103, as well as the pedestal seat 103 and the base member 104 are joined to each other, respectively, by the so-called die bonding process so as to be sealed airtight and fluid-tight. Besides, by the pressure introducing pipe 105 being joined to the lower surface of the base member 104, an internal passage of the pressure introducing pipe 105 and pressure introducing holes formed in respective central portions of the base member 104 and the pedestal seat 103 are communicated with one another in succession so that fluid is introduced to a pressure chamber 109 formed between an inner wall of the sensor element 102 including the pressure receiving portion 102a and the upper surface of the pedestal seat 103.

In addition, a vacuum chamber 110 is formed by a space defined by an outer surface of the unit body comprised of the sensor element 102, the pedestal seat 103 and the base member 104, and an inner wall surface of the cap 111.

In the pressure detecting device 101 as described above, the flange portion 111c of the cap 111 and the flange portion 104b of the base member 104 are joined together by welding in the final assembly process. Because of a strain and/or stress that occurs to the surface of the body portion 104a of the base member 104 due to the welding, there arises a crack Cr (see broken line in FIG. 9) in the silicon pedestal seat 103 so that the degree of vacuum of the vacuum chamber 110 decreases, or otherwise, even without the occurrence of the crack Cr, the sensor element 102 undergoes an effect of welding strain so that its pressure characteristics are varied, resulting in deteriorated detection accuracy, as a problem of the pressure detecting device 101.

The strain that occurs to the surface of the base member 104 because of the welding of the flange portions 104b, 111c with each other increases more and more with increasing size of the base member. Accordingly, when peripheral circuits are incorporated into the semiconductor sensor element 102, in which case the planar size of the base member 104 has been increased proportionally, the problem of welding strain of the base member 104 also increases.

In conjunction with this problem, the present inventor has found out as a result of energetic studies that the strain that occurs to the surface of the body portion of the base member 104 becomes a maximum at a center portion of the base member, whereas the thinner the flange portion 104b of the base member 104, the smaller the amount of strain, and that particularly when the thickness of the flange portion 104b is substantially equal to or less than the thickness of the flange portion 111c of the cap 111, the effect of the welding strain can be reduced to a very small one.

However, with respect to the thicknesses of the two flange portions 111c, 104b, since the flange portion 111c of the cap 111 is formed integrally with the cap 111, the setting range of its thickness would be restricted by the thickness of the cap 111 itself. Besides, since the flange portion 104b of the base member 104 is also integrally formed by compression molding an outer portion of the body portion 104a, an attempt to thin the flange portion 104b would be restricted by its wall thickness ratio to the thickness of the body portion 104a.

The base member 104 is a fundamental component that supports main part (pedestal seat 103 and sensor element 102) of the pressure detecting device 101, and so needs to be directly burdened with not only the thermal stress due to welding as stated above but also stress due to any load applied external thereto. Accordingly, it is important to enhance the rigidity of the base member 104 (in particular, rigidity of the portion that joins and supports the pedestal seat 103) from the point of view of improving the durability of the pressure detecting device.

SUMMARY OF THE INVENTION

The present invention having been accomplished in view of the above technical issues, it is an object of the invention to provide a semiconductor pressure detecting device capable of effectively reducing the stress that occurs to the base member due to the welding between cap and base member as well as to any external load.

In order to achieve the object, in a first aspect of the present invention, there is provided a semiconductor pressure detecting device including: a semiconductor sensor element capable of detecting a strain and/or stress that occurs on a thin-walled pressure receiving portion; a pedestal seat for joining and supporting the semiconductor sensor element; a base member for joining and supporting the pedestal seat; and a cap member welded and joined to the base member so as to cover the base member, the pedestal seat and the semiconductor sensor element, wherein a fluid pressure that acts on a pressure chamber formed between an inner wall of the semiconductor sensor element including the pressure receiving portion and a sensor element supporting surface of the pedestal seat is detected by the semiconductor sensor element, characterized in that the base member has a body portion of a specified thickness and a thin-walled flange portion formed integrally with an outer circumferential portion of the body portion, wherein a flange portion provided at an opening end of the cap member is welded and joined to the flange portion of the base member, thickness of the flange portion of the base member being set substantially equal to or less than thickness of the flange portion of the cap member.

With the semiconductor pressure detecting device according to the first aspect of the present invention, since the thickness of the flange portion formed integrally with the body portion of the base member is set substantially equal to or less than the thickness of the flange portion of the cap member, thermal deformation that occurs to the body portion of the base member due to the welding joint of the two flange portions with each other can be effectively absorbed by deformation of the flange portion of the base member.

As a result, the amount of strain that occurs to the body portion of the base member due to the welding is reduced, so that occurrence of such faults as cracks of the pedestal seat due to welding strain and decrease in the degree of vacuum of the vacuum chamber can be effectively prevented.

Also, in a second aspect of the present invention, there is provided a semiconductor pressure detecting device including: a semiconductor sensor element capable of detecting a strain and/or stress that occurs on a thin-walled pressure receiving portion; a pedestal seat for joining and supporting the semiconductor sensor element; a base member for joining and supporting the pedestal seat; and a cap member welded and joined to the base member so as to cover the base member, the pedestal seat and the semiconductor sensor element, wherein a fluid pressure that acts on a pressure chamber formed between an inner wall of the semiconductor sensor element including the pressure receiving portion and a sensor element supporting surface of the pedestal seat is detected by the semiconductor sensor element, characterized in that the base member has a body portion of a specified thickness and a thin-walled flange portion formed integrally with an outer circumferential portion of the body portion, wherein a flange portion provided at an opening end of the cap member is welded and joined to the flange portion of the base member and an annular recess is provided in a portion of the base member outside the joint portion with the pedestal seat.

With the semiconductor pressure detecting device according to the second aspect of the present invention, since the base member has an annular recess provided in a portion of the base member outside the joint portion with the pedestal seat, thermal deformation that occurs to the joint portion of the base member with the pedestal seat due to the welding joint of the two flange portions with each other can be effectively absorbed by deformation of the portion of the base member outside the recess.

As a result, the amount of strain that occurs to the joint portion of the base member with the pedestal seat due to the welding is reduced so that any adverse effect of welding strain on the joint portion can be avoided.

Further, in a third aspect of the present invention, there is provided a semiconductor pressure detecting device according to the second aspect of the invention, wherein the recess is provided in the flange portion of the base member.

With the semiconductor pressure detecting device according to the third aspect of the present invention, basically, the same effects as in the second aspect of the invention can be produced. In particular, since the recess is provided in the flange portion of the base member, thermal deformation that occurs to the joint portion of the base member with the pedestal seat due to the welding joint of the two flange portions with each other can be absorbed even more effectively by deformation of the portion of the flange portion of the base member outside the recess.

Still further, in a fourth aspect of the present invention, there is provided a semiconductor pressure detecting device according to the second aspect of the invention, wherein the recess is provided at the pedestal-seat supporting surface of the body portion of the base member.

With the semiconductor pressure detecting device according to the fourth aspect of the present invention, basically, the same effects as in the second aspect of the invention can be produced. In particular, since the recess is provided at the pedestal-seat supporting surface of the body portion of the base member, thermal deformation that occurs to the joint portion of the body portion of the base member with the pedestal seat due to the welding joint of the two flange portions with each other can be effectively absorbed by deformation of a portion of the body portion of the base member outside the recess.

Still further, in a fifth aspect of the present invention, there is provided a semiconductor pressure detecting device including: a semiconductor sensor element capable of detecting a strain and/or stress that occurs on a thin-walled pressure receiving portion; a pedestal seat for joining and supporting the semiconductor sensor element; and a base member for joining and supporting the pedestal seat, wherein fluid is introduced to a pressure chamber formed between an inner wall of the semiconductor sensor element including the pressure receiving portion and a sensor element supporting surface of the pedestal seat via pressure introducing holes provided in the base member and the pedestal seat, respectively, and a fluid pressure that acts on the pressure chamber is detected by the semiconductor sensor element, characterized in that cross-sectional size of the pressure introducing hole of the base member is set smaller than cross-sectional size of the pressure introducing hole of the pedestal seat.

With the semiconductor pressure detecting device according to the fifth aspect of the present invention, since the cross-sectional size of the pressure introducing hole of the base member is set smaller than the cross-sectional size of the pressure introducing hole of the pedestal seat, a peripheral portion of the pressure introducing hole where the amount of strain that occurs to the base member when thermal deformation due to the welding or any external load is applied to the base member ordinarily becomes a maximum is no longer present within the joint portion between the base member and the pedestal seat, so that adverse effect of the thermal deformation due to the welding or external load can be reduced.

Still further, in a sixth aspect of the present invention, there is provided a semiconductor pressure detecting device including: a semiconductor sensor element capable of detecting a strain and/or stress that occurs on a thin-walled pressure receiving portion; a pedestal seat for joining and supporting the semiconductor sensor element; a base member for joining and supporting the pedestal seat; and a pressure introducing pipe joined to one side of the base member opposite to the pedestal seat, wherein fluid is introduced to a pressure chamber formed between an inner wall of the semiconductor sensor element including the pressure receiving portion and a sensor element supporting surface of the pedestal seat via pressure introducing holes provided in the pressure introducing pipe, the base member and the pedestal seat, respectively, and a fluid pressure that acts on the pressure chamber is detected by the semiconductor sensor element, characterized in that the joint portion of the pedestal seat with the base member is located inside an outer circumference of the joint portion of the pressure introducing pipe with the base member.

With the semiconductor pressure detecting device according to the sixth aspect of the present invention, since the joint portion of the pedestal seat with the base member is located inside an outer circumference of the joint portion of the pressure introducing pipe with the base member, i.e., inside a portion where the rigidity is enhanced by the joint of the pressure introducing pipe, adverse effect of thermal deformation due to the welding on the joint portion between the base member and the pedestal seat or of any external load can be reduced.

Still further, in a seventh aspect of the present invention, there is provided a semiconductor pressure detecting device according to sixth aspect of the invention, wherein a joint end portion of the pressure introducing pipe joined to the base member is enlarged in diameter larger than the body portion of the pressure introducing pipe.

With the semiconductor pressure detecting device according to the seventh aspect of the present invention, basically, the same effects as in the sixth aspect of the invention can be produced. In particular, since the joint end portion of the pressure introducing pipe joined to the base member is enlarged in diameter so as to be larger than the body portion of the pressure introducing pipe, the joint portion of the pedestal seat with the base member can be located inner than an outer circumference of the joint portion of the pressure introducing pipe with the base member without much increasing the diameter of the body portion of the pressure introducing pipe.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
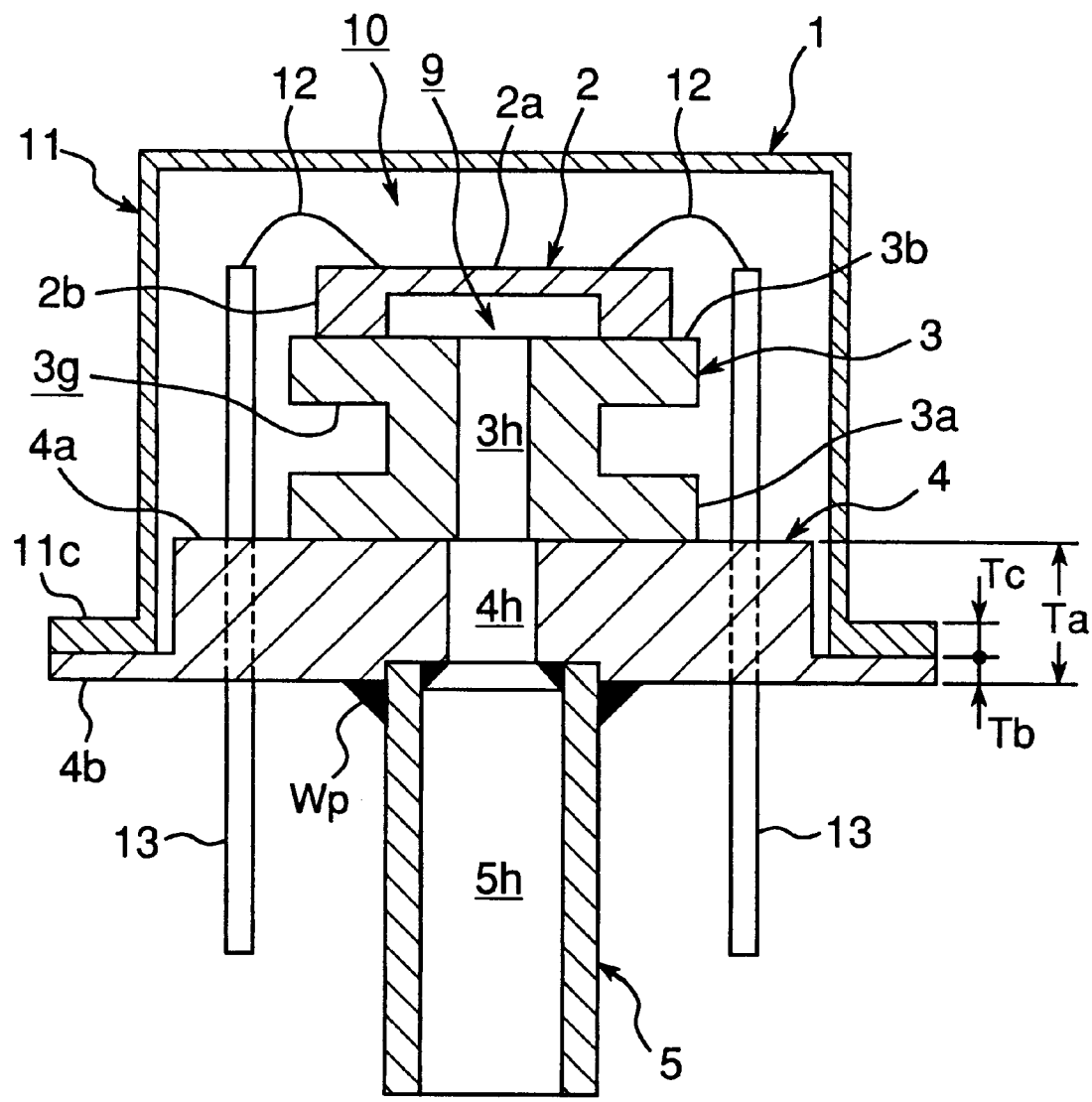
FIG. 1 is a longitudinal cross-sectional explanatory view of a semiconductor pressure detecting device according to a first embodiment of the invention.

Referring now to the drawings, wherein like reference numerals designate identical or corresponding parts throughout the several views, and more particularly to FIGS. 1–8 thereof, there are illustrated embodiments of the present invention as will be further described.

Embodiment 1

First, a semiconductor pressure detecting device 1 (hereinafter, abbreviated simply as pressure detecting device or device, when appropriate) according to a first embodiment of the invention as shown in FIG. 1 is explained.

FIG. 1 is a longitudinal cross-sectional explanatory view of the pressure detecting device 1 according to this embodiment. As shown in FIG. 1, the pressure detecting device 1 comprises a semiconductor sensor element 2 (hereinafter, abbreviated simply as sensor element when appropriate)

having at a central portion a thin-walled diaphragm-like pressure receiving portion 2a, a pedestal seat 3 for joining and supporting the sensor element 2, and a metallic base member 4 for joining and supporting the pedestal seat 3.

These three component members 2, 3 and 4 constitute a unit body (sensor unit) in a joined state as they are stacked one on another. This sensor unit is covered with a metallic cap 11 whose lower end opening portion is joined to an outer peripheral portion of the base member 4. Also, a pressure introducing pipe 5 for introducing into a pressure chamber 9 a fluid to detect the pressure of the pressure chamber 9 is joined to the lower surface side of the base member 4, for example, by brazing (brazing portion Wp).

The base member 4 comprises has a body portion 4a (plate thickness Ta) for joining and supporting the pedestal seat 3 on its top side, and a thin-walled (plate thickness Tb) flange portion 4b provided on an outer peripheral side of the body portion 4a. This flange portion 4b is formed integrally with the body portion 4a by compression molding an outer peripheral portion of the body portion 4a with a press. To this flange portion 4b, is joined a flange portion 11c (plate thickness Tc) formed at the lower end opening portion of the cap 11. The two flange portions 4b, 11c are joined together, for example, by welding in vacuum.

In this embodiment, the thickness (Tb) of the flange portion 4b of the base member 4 is set substantially equal to or less than the thickness (Tc) of the flange portion 11c of the cap 11. Since the thickness (Tc) of the flange portion 11c of the cap 11 is 0.25 to 0.3 mm at a minimum value in terms of the molding process of the cap 11, the thickness (Tb) of the flange portion 4b of the base member 4 is preferably set to 0.25 to 0.3 mm.

In addition, to the body portion 4a of the base member 4 are fixed a plurality of lead wires 13 inserted and led therethrough thicknesswise of the body portion 4a. Each lead wire 13 is electrically connected to the sensor element 2 via a wire 12 made of, for example, gold (Au).

Also, a pressure introducing hole 4h is provided at a central portion of the body portion 4a of the base member 4 through the base member 4 thicknesswise.

The pedestal seat 3 includes a pair of fitting plates 3a, 3b which are made of, for example, silicon and opposed to each other with an annular recess 3g therebetween. The sensor element 2 is joined to the upper surface of the upper fitting plate 3b, while the lower surface of the lower fitting plate 3a is joined to the upper surface of the body portion 4a of the base member 4. In addition, the fitting plates 3a, 3b are preferably formed each into a rectangular shape as viewed in plan view.

Further, a pressure introducing hole 3h is provided at a central portion of the pedestal seat 3 through the pedestal seat 3.

The semiconductor sensor element 2, as is well known conventionally, detects the magnitude and/or change of a pressure by detecting a strain and/or stress by making use of the semiconductors' piezoresistance effect. In this embodiment, the sensor element 2 is a diaphragm type one made of silicon (Si) single crystal as an example.

More specifically, the sensor element 2 is formed, for example, into a rectangular plate material as viewed in plan view and a thin-film diaphragm-like pressure receiving portion 12a is formed at a central portion of the sensor element 2 as described above. A fitting base portion 2b is provided around the pressure receiving portion 2a. The lower end face of the fitting base portion 2b is joined to the upper surface of the upper fitting plate 3b of the pedestal seat 3.

The fitting base portion 2b of the sensor element 2 and the upper fitting plate 3b of the pedestal seat 3, as well as the lower fitting plate 3a of the pedestal seat 3 and the body portion 4a of the base member 4 are joined to each other, respectively, by the so-called die bonding process so as to be sealed airtight and fluid-tight.

Besides, by the pressure introducing pipe 5 being brazed to the lower surface of the base member 4, an internal passage 5h of the pressure introducing pipe 5, the pressure introducing hole 4h of the base member 4 and the pressure introducing hole 3h of the pedestal seat 3 are communicated with each other in succession so that fluid to detect the pressure of the pressure chamber 9 is introduced into the pressure chamber 9 formed between the inner wall of the sensor element 2 including the pressure receiving portion 2a and the upper surface of the pedestal seat 3.

In addition, a vacuum chamber 10 is formed by a space defined by an outer surface of the sensor unit comprised of the sensor element 2, the pedestal seat 3 and the base member 4, and an inner wall surface of the cap 11. The internal pressure of the vacuum chamber 10 serves as the reference pressure in detecting the pressure in the pressure chamber 9.

In this embodiment, more preferably, peripheral circuits including, for example, a resistor circuit for adjusting the electrical characteristics of the sensor element 2 and the like in addition to a gauge resistor for detecting strain and/or stress are incorporated and integrated into the semiconductor sensor element 2. Accordingly, the sensor element 2 itself as well as the pedestal seat 3 and the base member 4 for supporting the sensor element 2 have been increased in size (particularly, planar size), as compared with the case in which the peripheral circuits and the like are formed on a separate board.

A strain and/or stress that has occurred to the pressure receiving portion 2a of the sensor element 2 (i.e., a pressure that acts on the pressure chamber 9) is converted into an electric signal, and the electric signal thus obtained is outputted outside via the wires 12 and the lead wires 13.

This semiconductor sensor element 2 is similar to a conventional known one. Therefore, detailed description and illustration of its construction and operation and the like are omitted.

With the semiconductor pressure detecting device 1 constructed as described above, we performed a test for measuring the amount of strain at a central portion of the base member 4 (more specifically, a vicinity of peripheral part of the pressure introducing hole 4h of the body portion 4a) where during the process of welding the flange portion 4b of the base member 4 and the flange portion 11c of the cap 11 together, the amount of strain that occurs to the base member 4 due to the welding becomes a maximum.

In this test, three kinds of samples were used including a sample according to this embodiment (Invention Example 1) of which the thickness (Ta) of the body portion 4a was about 1.2 mm and the thickness (Tb) of the flange portion 4b was about 0.3 mm, a sample according to the prior art (Prior Art Example) of which the thickness (Ta) of the body portion 4a was about 1.5 mm and the thickness (Tb) of the flange portion 4b was about 0.5 mm, and a sample (Invention Example 2) of which the thicknesses (Ta, Tb) were the same as those of the sample according to the prior art (Prior Art Example) and in which a recessed portion was provided in the base member as will be described later. It is noted that the thickness ratio of flange portion to body portion of the base member (Tb/Ta) was about ¼ in Invention Example 1 and about ⅓ in Invention Example 2 and Prior Art Example. The outer diameter of the base member was about 14.7 mm.

Meanwhile, the thickness (Tc) of the flange portion 11c of the cap member 11 was more preferably substantially equal to the plate thickness of its body portion, being about 0.28 mm. That is, in the case of Invention Example 1, the thickness (Tb=about 0.3 mm) of the flange portion 4b of the base member 4 was set so as to be substantially equal to the thickness (Tc) of the flange portion 11c of the cap member 11.

Then, with respect to each sample, with a strain gauge attached to a vicinity of the peripheral part of the pressure introducing hole 4h of the body portion 4a, the maximum strain during the welding and residual strain after the welding were measured. Test results were as shown in Table 1.

TABLE 1

|  | Thickness (mm) | | | Amount of strain at central portion (mm) | |
| --- | --- | --- | --- | --- | --- |
|  | Flange portion, Tb | Body portion, Ta | Recess | Max. strain during welding | Residual strain after welding |
| Invention Example 1 | 0.3 | 1.2 | Not provided | $65 \times 10^{-6}$ | $11 \times 10^{-6}$ |
| Invention Example 2 | 0.5 | 1.5 | Provided | $110 \times 10^{-6}$ | $41 \times 10^{-6}$ |
| Prior Art Example | 0.5 | 1.5 | Not provided | $110 \times 10^{-6}$ | $100 \times 10^{-6}$ |

As apparent from Table 1, in the case of Invention devices 1, both the maximum strain during the welding and residual strain after the welding are smaller than those of Prior Art Example and, in particular, the residual strain is extremely smaller. This is because, with respect to the relationship between the thickness (Tb) of the flange portion 4b of the base member 4 and the thickness (Tc) of the flange portion 11c of the cap member 11, whereas Tb (about 0.5 mm) was set quite larger than Tc (about 0.28 mm) in Prior Art Example (Tb/Tc=about 1.8), Tb (about 0.3 mm) was set substantially equal to Tc (about 0.28 mm) in Invention Example 1 (Tb/Tc=about 1.07) so that thermal deformation that occurs to the body portion 4a of the base member 4 due to the welding is effectively absorbed by deformation of the flange portion 4b of the base member 4.

As shown above, according to this embodiment, since the thickness (Tb) of the flange portion 4b formed integrally with the body portion 4a of the base member 4 is set substantially equal to the thickness (Tc) of the flange portion 11c of the cap member 11, thermal deformation that occurs to the body portion 4a of the base member 4 due to the welding joint of the two flange portions 4b, 11c with each other can be effectively absorbed by deformation of the flange portion 4b of the base member 4.

As a result, the amount of strain that occurs to the surface of the body portion 4a of the base member 4 due to the welding is reduced, so that occurrence of such faults as cracks of the pedestal seat 3 due to welding strain and decrease in the degree of vacuum of the vacuum chamber 10 can be effectively prevented.

In the above Invention Example 1, the thickness Tb of the flange portion 4b of the base member 4 was substantially equal to the thickness Tc of the flange portion 11c of the cap member 11. However, it can be considered that setting the value of Tb to a smaller one as compared with Tc (i.e., smaller than Tc) makes it possible to obtain an absorption effect for thermal deformation of the base member body portion 4a due to the welding equivalent to or more than that of Invention Example 1.

In fabricating the flange portion 4b of the base member 4, a smaller thickness Tb can be achieved by further devising the molding conditions for the compression molding of the base member 4 with a press, or by adding a machining process for machining the flange portion 4b by, for example, cutting process after the molding, or by changing the method of molding for the base member 4.

Embodiment 2

Next, a semiconductor pressure detecting device according to a second embodiment of the invention is described. In the following description, component parts similar to those of the first embodiment are designated by like reference numerals and their further description is omitted. Further, in the following embodiments, only main part of the pressure detecting device is depicted in the drawings corresponding to the respective embodiments, and the cap 11 or the sensor element 2 as well is omitted in illustration, but actually the cap 11 and the sensor element 2 similar to those in the first embodiment are provided.

Figure 2:
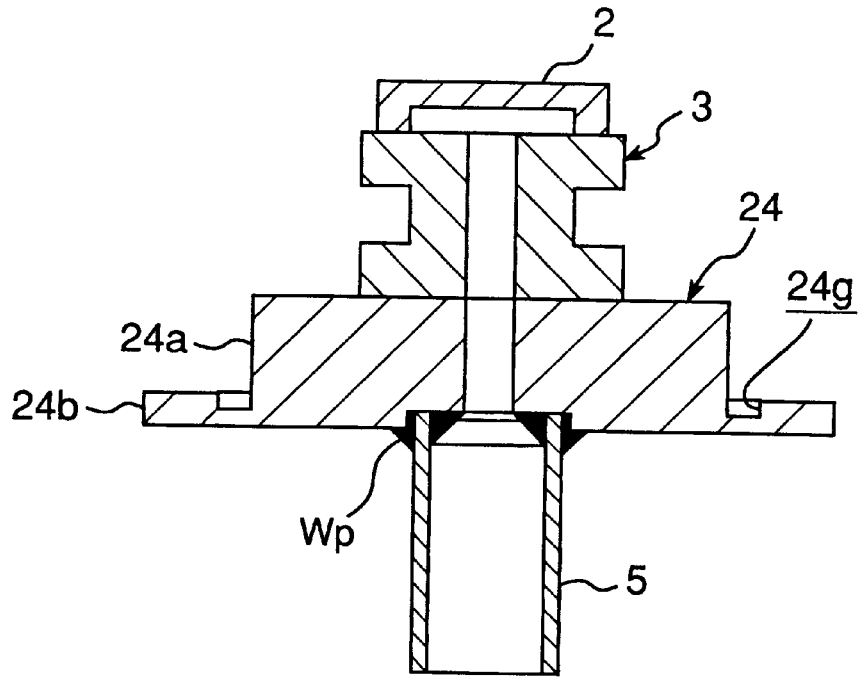
FIG. 2 is a longitudinal cross-sectional explanatory view showing main part of a semiconductor pressure detecting device according to a second embodiment of the invention.

In the pressure detecting device according to the second embodiment, as FIG. 2 shows main part of it, an annular recess 24g is provided in a portion of the base member 24 outside the joint portion with the pedestal seat 3. In addition, the pressure detecting device according to this second embodiment is the one represented by Invention Example 2 in Table 1.

In the case of the first embodiment, in which the thickness (Tb) of the flange portion 4b of the base member 4 is set substantially equal to or less than the thickness (Tc) of the flange portion 11c of the cap member 11, because the flange portion 4b of the base member 4 is integrally formed by compression molding an outer portion of the body portion 4a, an attempt to lessen the thickness (Tb) of the flange portion 4b would be restricted by its wall thickness ratio to the thickness (Ta) of the body portion 4a. Accordingly, in the first embodiment, in order to set the thickness (Tb) of the flange portion 4b of the base member 4 to 0.3 mm, the thickness (Ta) of the body portion 4a is made slightly thinner (1.5 mm to 1.2 mm) than that of the prior art. Thus, the rigidity of the body portion 4a itself of the base member 4 would be lowered correspondingly.

The second embodiment is so designed as to reduce the amount of strain that occurs to the surface of the body portion 4a of the base member 4 due to welding while maintaining the thickness (Ta) of the body portion 4a of the base member 4 to the same thickness as that of Prior Art devices (1.5 mm).

The recess 24g is set to a depth of, for example, 0.25 mm and, concretely, formed at, for example, a root portion of a flange portion 24b (which is a boundary portion with a body portion 24a and which is a site free from any interference with the joint portion with the flange portion 11c of the cap 11). When the flange portion 24b of the base member 24 and the flange portion 11c of the cap 11 are welded together, thermal deformation that occurs to the joint portion of the body portion 24a of the base member 24 with the pedestal seat 3 can be effectively absorbed by deformation of a portion of the base member 24 (i.e. of the flange portion 24b) outer than the recess 24g.

Consequently, as can be well understood from the test results of Table 1 (Invention Example 2), although the maximum strain during the welding is of the same value as in Prior Art devices so that no effect can be recognized, residual strain after the welding is indeed short of that of the first embodiment (Invention Example 1) but considerably reduced as compared with Prior Art devices.

In particular, in this case, because the recess 24g is provided in the thin flange portion 24b of the base member 24, thermal deformation can be absorbed more effectively as compared with the case where it is provided in the body portion 24a.

Also in this case, the body portion 24a of the base member 24 is thicker than that in the first embodiment, the rigidity of the base member 24 itself can be maintained high.

That is, when a load acts on the pressure introducing pipe 5 vertically, the relationship between a stress σ that occurs to the central surface of the base member 24 and the plate thickness t of the base member 24 can be expressed by the following equation (1):

$$\sigma \propto 1/t^3 \qquad (1)$$

Accordingly, in this embodiment, it can be understood that by the plate thickness of the base member 24 being maintained at 1.5 mm, even if a vertical load of the same magnitude acts on the pressure introducing pipe 5, the stress σ that occurs to the central surface of the base member 24 is reduced to about one half that in the first embodiment, hence an enhanced rigidity against the action of an external load.

As described above, according to this embodiment, since the annular recess 24g is provided in a portion of the base member 24 outside the joint portion with the pedestal seat 3, thermal deformation that occurs to the joint portion of the base member 24 with the pedestal seat 3 due to the welding joint of the two flange portions 24b, 11c with each other can be effectively absorbed by deformation of a portion of the base member 24 outside the recess 24g.

As a result, the amount of strain that occurs to the joint portion of the base member 24 with the pedestal seat 3 due to the welding is reduced so that any adverse effect of welding strain on the joint portion can be avoided.

In particular, since the recess 24g is provided in the flange portion 24b of the base member 24, thermal deformation that occurs to the joint portion of the base member 24 with the pedestal seat 3 due to the welding joint of the two flange portions 24b, 11c with each other can be absorbed even more effectively by deformation of the portion of the flange portion 24b of the base member 24 outside the recess 24g.

Embodiment 3

Figure 3:
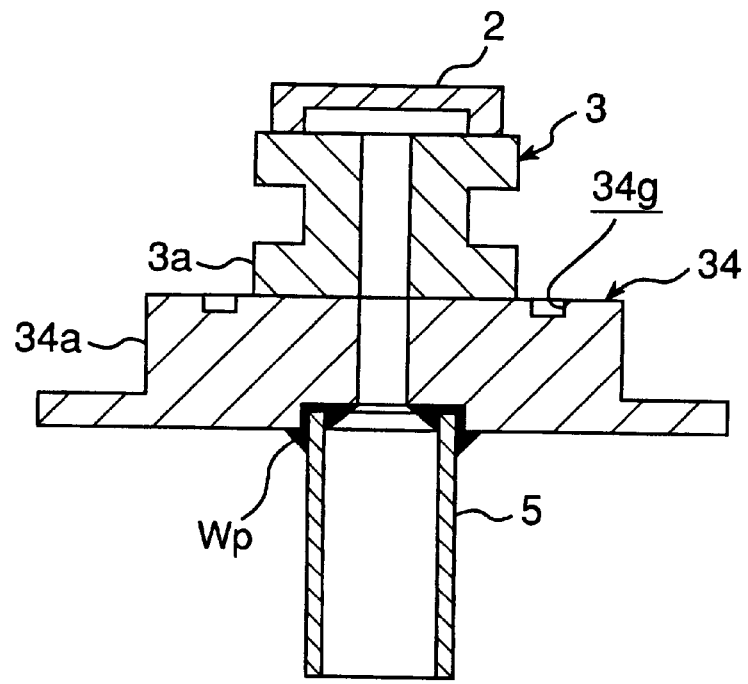
FIG. 3 is a longitudinal cross-sectional explanatory view showing main part of a semiconductor pressure detecting device according to a third embodiment of the invention.

FIG. 3 shows main part of a semiconductor pressure detecting device according to a third embodiment of the invention. In this third embodiment, an annular recess 34g is provided in a body portion 34a of a base member 34. This recess 34g is formed, concretely, at a top surface of the body portion 34a, i.e., at a pedestal-seat supporting surface of the body portion 34a.

In this case also, thermal deformation that occurs to the joint portion of the body portion 34a of the base member 34 with the pedestal seat 3 due to the welding joint of the flange portions of the base member 34 and the cap 11 with each other can be effectively absorbed by deformation of a portion of the body portion 34a of the base member 34 outside the recess 34g.

This embodiment is effective especially for such cases as there is difficulty in providing the recess in the flange portion of the base member in terms of space.

Embodiment 4

Next, a fourth embodiment of the invention is described. It is noted that in the following embodiments inclining this fourth embodiment, more preferably, the thickness of the flange portion of the base member is set substantially equal to or less than the thickness of the flange portion of the cap member 11 as in the first embodiment, so that the same effects as in the first embodiment can be produced as well.

Figure 4:
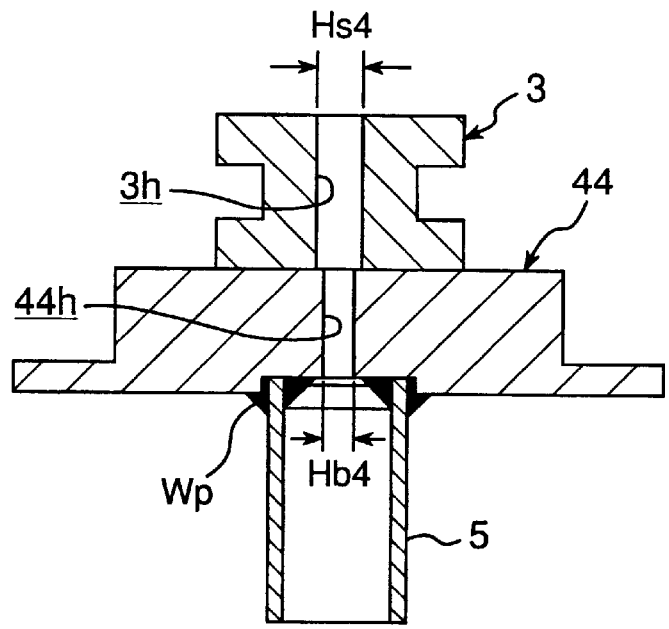
FIG. 4 is a longitudinal cross-sectional explanatory view showing main part of a semiconductor pressure detecting device according to a fourth embodiment of the invention.

In the pressure detecting device according to this fourth embodiment, as FIG. 4 shows main part of it, the cross-sectional size (diameter Hb4) of a pressure introducing hole 44h of a base member 44 is set smaller than the cross-sectional size (diameter Hs4) of the pressure introducing hole 3h of the pedestal seat 3.

Consequently, according to this embodiment, a central portion of the base member 44, i.e. a peripheral portion of the pressure introducing hole 44h, where the amount of strain that occurs to the base member 44 when thermal deformation due to the welding or any external load is applied to the base member 44 ordinarily becomes a maximum is no longer present within the joint portion between the base member 44 and the pedestal seat 3, so that adverse effect of the thermal deformation due to the welding or external load can be reduced.

In this case, the cross-sectional size (diameter Hb4) of the pressure introducing hole 44h of the base member 44 should be at least about 0.5 mm as a minimum value, and is desirably, for example, about 0.5 to 1.5 mm in order to avoid clogging of the pressure introducing hole 44h due to contaminations, foreign matters or the like in the pressure fluid.

Embodiment 5

Figure 5:
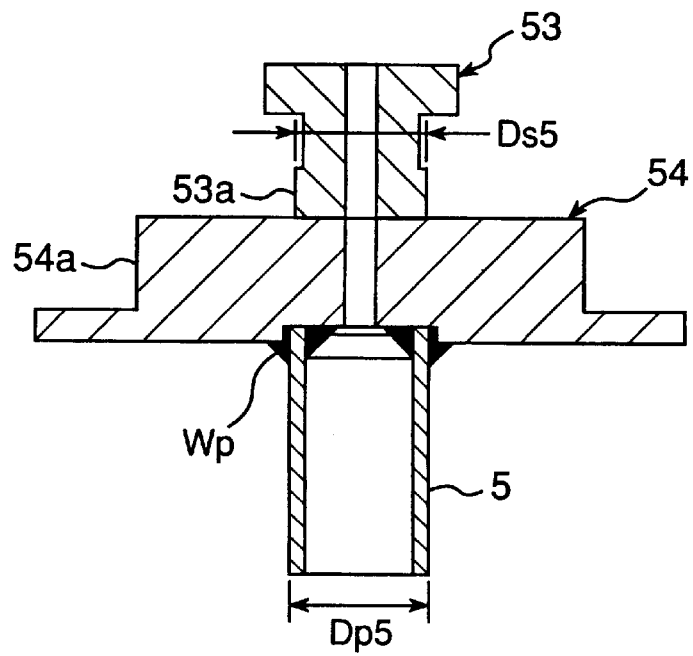
FIG. 5 is a longitudinal cross-sectional explanatory view showing main part of a semiconductor pressure detecting device according to a fifth embodiment of the invention.

FIG. 5 shows main part of a semiconductor pressure detecting device according to a fifth embodiment of the invention. In this fifth embodiment, particularly the planar size (maximum size of one side Ds5) of a lower fitting plate 53a of a pedestal seat 53 is set smaller. As a result, the joint portion of the pedestal seat 53 with a body portion 54a of a base member 54 is located inside an outer circumference (outer diameter size Dp5) of the joint portion of the pressure introducing pipe 5 with the base member 54, i.e., inside a portion where the rigidity is enhanced by the joint of the pressure introducing pipe 5.

Therefore, adverse effect of thermal deformation due to the welding on the joint portion between the base member 54 and the pedestal seat 53 or of any external load can be reduced.

This embodiment is effective especially for cases where the outer diameter of the pressure introducing pipe 5 cannot be increased.

Embodiment 6

Figure 6:
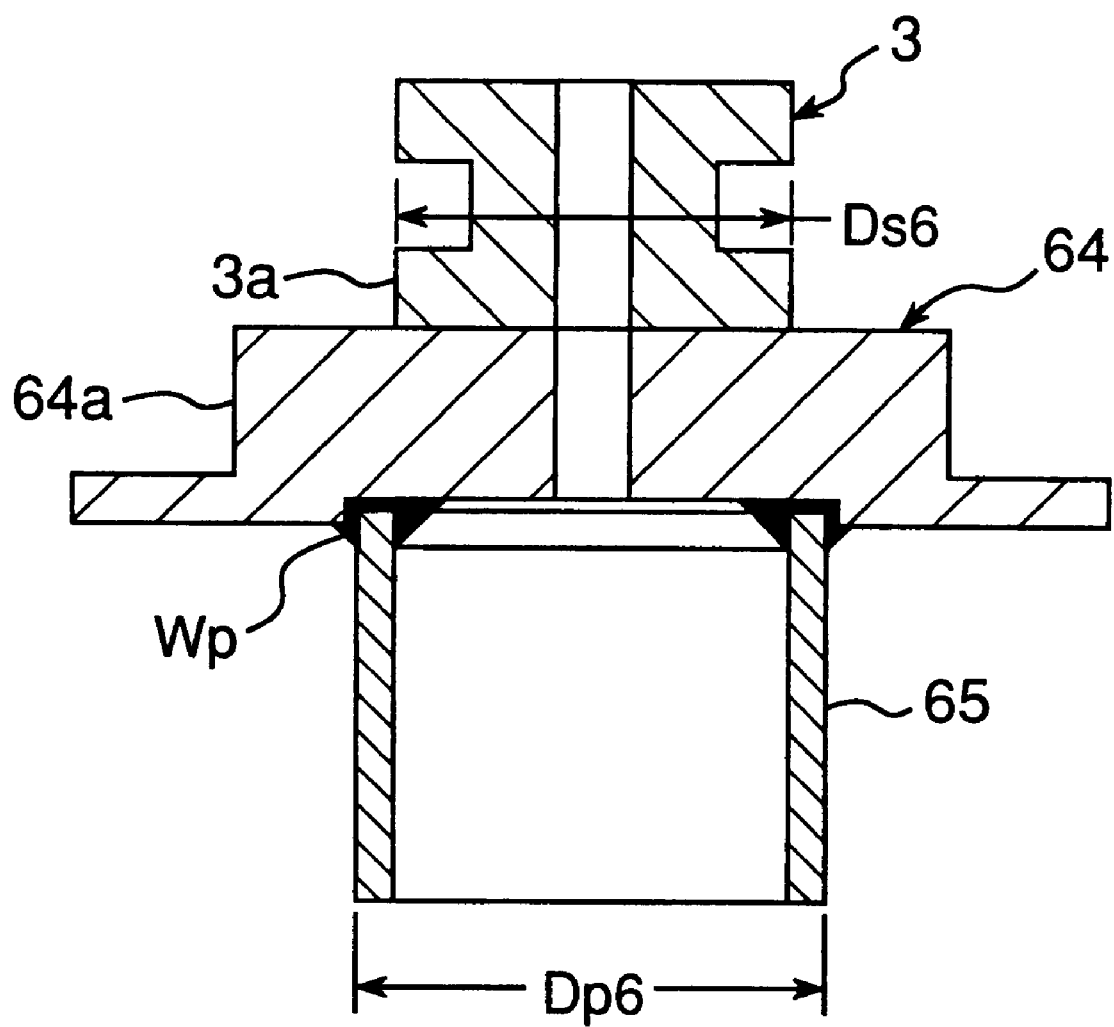
FIG. 6 is a longitudinal cross-sectional explanatory view showing main part of a semiconductor pressure detecting device according to a sixth embodiment of the invention.

FIG. 6 shows main part of a semiconductor pressure detecting device according to a sixth embodiment of the invention. In this sixth embodiment, converse to the fifth embodiment, the outer diameter (Dp6) of a pressure introducing pipe 65 is set larger while the planar size (maximum size of one side Ds6) of the lower fitting plate 3a of the pedestal seat 3 is unchanged.

As a result, the joint portion of the pedestal seat 3 with a body portion 64 of a base member 64 is located inside an outer circumference (outer diameter size Dp6) of the joint portion of the pressure introducing pipe 65 with the base member 64, i.e., inside a portion where the rigidity is enhanced by the joint of the pressure introducing pipe 65, so that the same effects as in the fifth embodiment can be produced.

Embodiment 7

Figure 7:
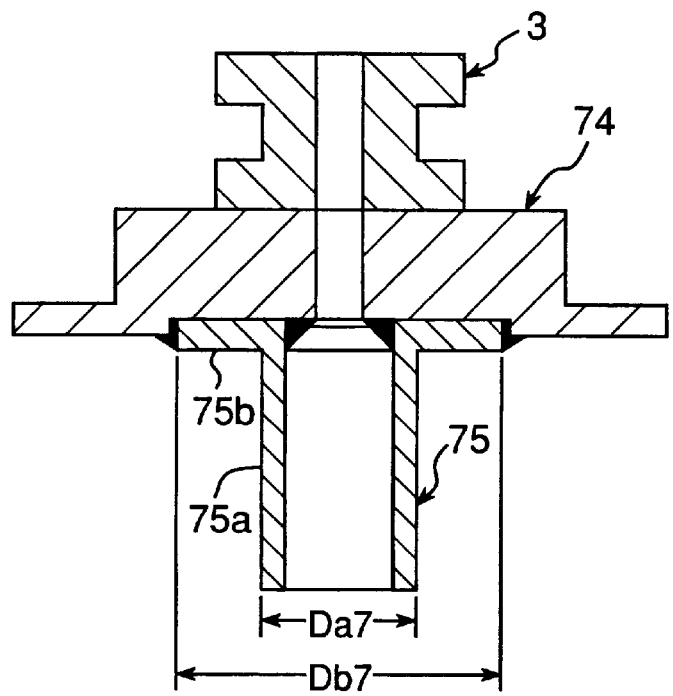
FIG. 7 is a longitudinal cross-sectional explanatory view showing main part of a semiconductor pressure detecting device according to a seventh embodiment of the invention.

FIG. 7 shows main part of a semiconductor pressure detecting device according to a seventh embodiment of the invention. In this seventh embodiment, a joint end portion 75b of a pressure introducing pipe 75 joined to a base member 74 is formed into a flange shape, and enlarged in diameter so as to be larger than a body portion 75a of the pressure introducing pipe 75.

As a result, the joint portion of the pedestal seat 3 with a body portion of the base member 74 is located inside an outer circumference (outer diameter size Db7) of the joint portion of the pressure introducing pipe 75 with the base member 74, i.e., inside a portion where the rigidity is enhanced by the joint of the pressure introducing pipe 75, so that the same effects as in the fifth embodiment can be produced.

In particular, in this case, the joint portion of the pedestal seat 3 with the base member 74 can be located inside the outer circumference of the joint portion of the pressure introducing pipe 75 with the base member 74 without much increasing the diameter (outer diameter Da7) of the body portion 75a of the pressure introducing pipe 75.

Embodiment 8

Figure 8:
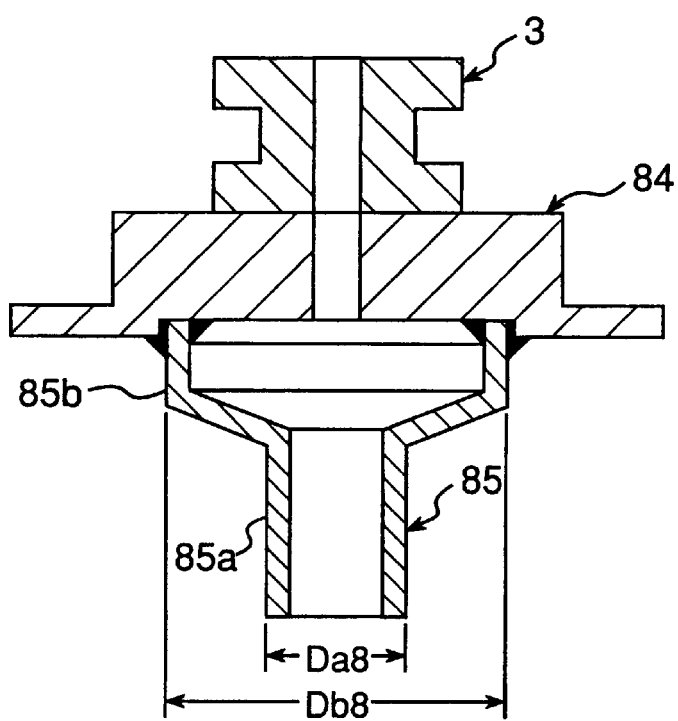
FIG. 8 is a longitudinal cross-sectional explanatory view showing main part of a semiconductor pressure detecting device according to an eighth embodiment of the invention.
Figure 9:
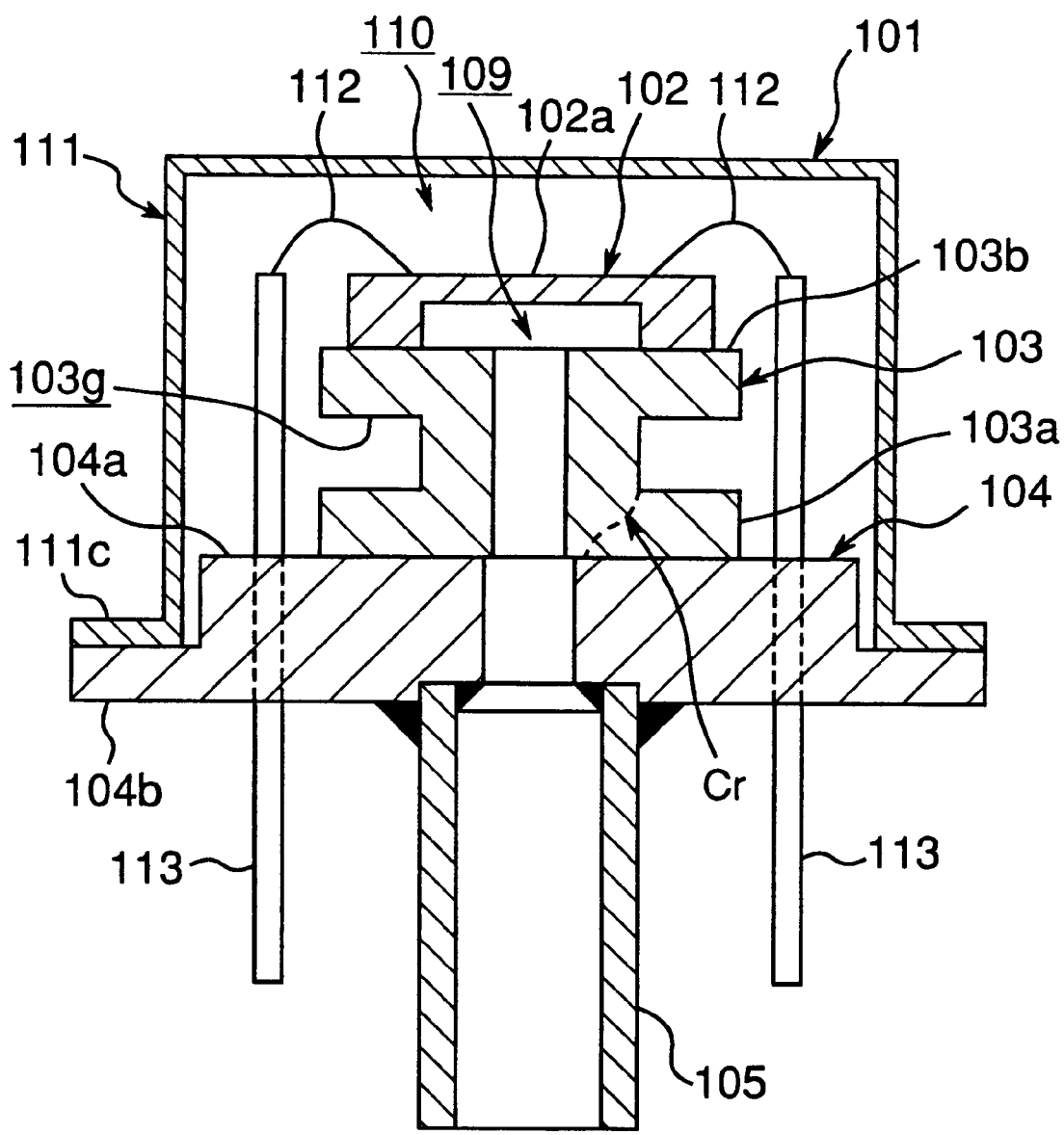
FIG. 9 is a longitudinal cross-sectional explanatory view of a semiconductor pressure detecting device according to the prior art.

FIG. 8 shows main part of a semiconductor pressure detecting device according to an eighth embodiment of the invention. In this eighth embodiment, a joint end portion 85b of a pressure introducing pipe 85 to be joined to a base member 84 is enlarged in diameter larger than a body portion 85a of the pressure introducing pipe 85.

As a result, the joint portion of the pedestal seat 3 with a body portion of the base member 84 is located inside an outer circumference (outer diameter size Db8) of the joint portion of the pressure introducing pipe 85 with the base member 84, i.e., inside a portion where the rigidity is enhanced by the joint of the pressure introducing pipe 85, so that the same effects as in the fifth embodiment can be produced.

In particular, in this case, the joint portion of the pedestal seat 3 with the base member 84 can be located inside the outer circumference of the joint portion of the pressure introducing pipe 85 with the base member 84 without much increasing the diameter (outer diameter Da8) of the body portion 85a of the pressure introducing pipe 85.

In addition, the present invention is not limited to the above-described embodiments and various modifications or design changes may be made without departing the gist of the invention.

What is claimed is:

1. A semiconductor pressure detecting device comprising:
    a semiconductor sensor element capable of detecting a strain and/or stress that occurs on a thin-walled pressure receiving portion;
    a pedestal seat for joining and supporting the semiconductor sensor element;
    a base member for joining and supporting the pedestal seat; and
    a cap member welded and joined to the base member so as to cover the base member, the pedestal seat and the semiconductor sensor element,
    wherein a fluid pressure that acts on a pressure chamber formed between an inner wall of the semiconductor sensor element including the pressure receiving portion and a sensor element supporting surface of the pedestal seat is detected by the semiconductor sensor element,
    the base member has a body portion of a specified thickness and a thin-walled flange portion formed integrally with an outer circumferential portion of the body portion and forming an L-shaped cross-section therewith,
    a flange portion is provided at an opening end of the cap member and is welded and joined to the flange portion of the base member, and
    a thickness of the flange portion of the base member is substantially equal to or less than a thickness of the flange portion of the cap member.

2. A semiconductor pressure detecting device comprising:
    a semiconductor sensor element capable of detecting a strain and/or stress that occurs on a thin-walled pressure receiving portion;
    a pedestal seat for joining and supporting the semiconductor sensor element;
    a base member for joining and supporting the pedestal seat; and
    a cap member welded and joined to the base member so as to cover the base member, the pedestal seat and the semiconductor sensor element,
    wherein a fluid pressure that acts on a pressure chamber formed between an inner wall of the semiconductor sensor element including the pressure receiving portion and a sensor element supporting surface of the pedestal seat is detected by the semiconductor sensor element,
    the base member has a body portion of a specified thickness and a thin-walled flange portion formed integrally with an outer circumferential portion of the body portion,
    a flange portion is provided at an opening end of the cap member and is welded and joined to the flange portion of the base member, and
    an annular recess is provided in a portion of the base member outside the joint portion with the pedestal seat.

3. The semiconductor pressure detecting device according to claim 2, wherein the recess is provided in the flange portion of the base member.

4. The semiconductor pressure detecting device according to claim 2, wherein the recess is provided at the pedestal-seat supporting surface of the body portion of the base member.

5. A semiconductor pressure detecting device comprising:
    a semiconductor sensor element capable of detecting a strain and/or stress that occurs on a thin-walled pressure receiving portion;
    a pedestal seat for joining and supporting the semiconductor sensor element; and
    a base member for joining and supporting the pedestal seat,
    wherein fluid is introduced to a pressure chamber formed between an inner wall of the semiconductor sensor element including the pressure receiving portion and a sensor element supporting surface of the pedestal seat via pressure introducing holes provided in the base member and the pedestal seat, respectively,
    a fluid pressure that acts on the pressure chamber is detected by the semiconductor sensor element, and
    a cross-sectional size of the pressure introducing hole of the base member is smaller than a cross-sectional size of the pressure introducing hole of the pedestal seat.

* * * * *